W. S. LEWIS.
POWER TRANSMISSION AND DIRECTION CHANGING DEVICE.
APPLICATION FILED OCT. 15, 1908.
934,821.
Patented Sept. 21, 1909.
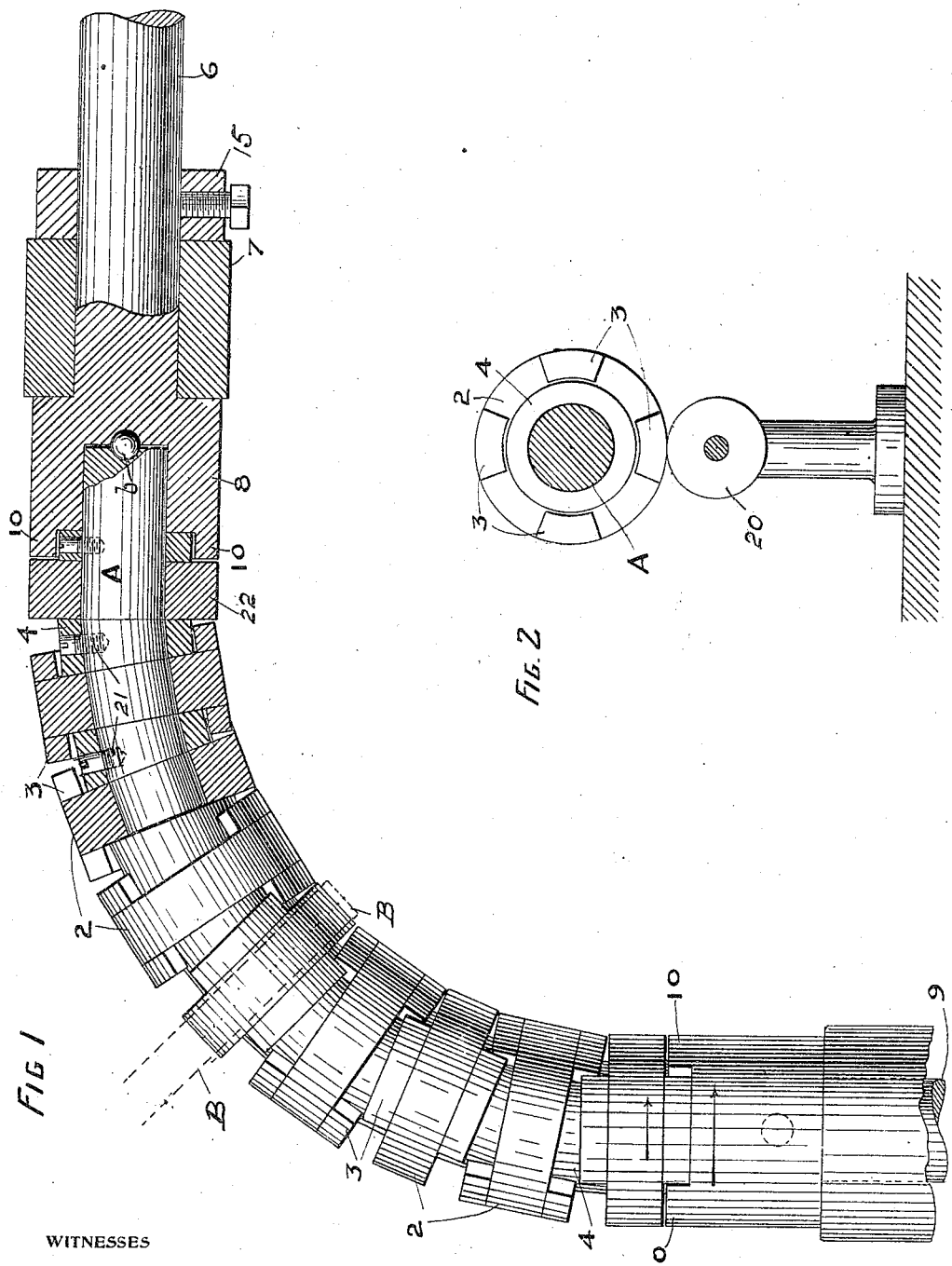
WITNESSES
INVENTOR
Walter S. Lewis
BY
ATTORNEY

UNITED STATES PATENT OFFICE.

WALTER S. LEWIS, OF SAN FRANCISCO, CALIFORNIA, ASSIGNOR OF ONE-FOURTH TO W. W. T. BERRILL AND ONE-FOURTH TO FRANK BAHAYE, OF SAN FRANCISCO, CALIFORNIA.

POWER-TRANSMISSION AND DIRECTION-CHANGING DEVICE.

934,821.   Specification of Letters Patent.   Patented Sept. 21, 1909.

Application filed October 15, 1908. Serial No. 457,872.

*To all whom it may concern:*

Be it known that I, WALTER S. LEWIS, citizen of the United States, residing in the city and county of San Francisco and State of California, have invented new and useful Improvements in Power-Transmission and Direction-Changing Devices, of which the following is a specification.

My invention relates to a means for transmitting power and changing the direction thereof.

It consists of a fixed shaft curved or otherwise supported to give the required direction or change of travel and a series of disks freely turnable thereon, said disks having lugs whereby motion may be transmitted from one disk to the other, and means by which motion from a prime mover may be transmitted through the disks.

It also comprises details of construction which will be more fully explained by reference to the accompanying drawings, in which—

Figure 1 is a plan of the device, partly sectioned. Fig. 2 is an elevation of one of the disks, showing the shaft in section and showing a means for supporting said disk.

My invention is designed to provide a means for transmitting motion and changing direction to any degree, without the use of flexible shafts, gears, or other ordinary means for making such changes.

As shown in my present device, A is a shaft which may be made of steel or suitable metal turned or otherwise formed to provide a surface suitable to receive the disks and to allow them to turn freely thereon. This shaft may be made in a single piece and curved to produce the desired change of direction, or it may be made up of a series of sections, the ends of which are beveled or converged, so that the successive series when united will provide for the desired change of direction.

Upon the shaft a series of disks 2 are mounted, these disks being annular in form with the inner circumference of such diameter that they will turn freely upon the shaft. Each of the disks is provided with lugs 3 near the periphery and projecting outwardly or toward the adjacent disks.

Between contiguous disks are collars 4 which are fixed to the shaft A by screws 21 or other suitable means. Between the end collar and the adjacent end of the enlarged portion 8, is a plain collar 22, as shown in Fig. 1. The curvature of the shaft for the desired change of direction having been determined, the collars 4 are made wedge-shaped, so that the outer portion is thicker than the inner portion, and the proportions are such that planes through the disks will intersect upon the axis about which the curvature of the shaft is made. The inclined faces of the collars thus hold the disks in the corresponding relation to each other and to the shaft, so that they are all substantially from the common center.

The lugs upon the disks are so disposed that they project sufficiently beyond the collars, so that they will interlock while passing the inner curvature of the shaft, and will separate to a certain extent as they pass around the outer curvature of the shaft, the separation depending on the difference in thickness between the inner edges of the collars and their outer edges. It will be thus seen that if the disks at one end are driven by means of the interlocking lugs, each disk will drive the successive one, and thus all the disks will be driven. In order to transmit motion to these disks, the power shaft 6 may have a journaled bearing, as shown at 7, held by a collar 15, and an enlarged portion 8 is chambered so that the chambered end will slip over the end of the shaft A. The opposite end of shaft A may in like manner have connection with a shaft 9 similarly connected. The ends of the chambered portions of the shaft are provided with lugs 10 which engage with the lugs of the contiguous disks. Thus, when power is applied to rotate one of the shafts 6, the power will be transmitted through the lugs 10 which engage with the lugs of the first of the disks on the curved stationary shaft; and power will be transmitted through all the disks around the curve and finally through the lugs 10 upon the enlarged portion of the transmitting shaft which connects with that end; and thus the power may be delivered wherever desired. In order to allow these exterior shafts to turn freely without friction, I employ any suitable ball or equivalent bearing *b* where the ends of the stationary shaft A abut against the bottom of the chambers of the contiguous abutting transmitting shafts. The latter are thus allowed to revolve freely without danger of heating, while the curved shaft A remains stationary.

It will be seen that by this construction any desired amount of curvature or change of direction may be effected, and power may be transmitted through this change to operate in a totally different plane of travel from that at which it is delivered to the change device.

The shaft A may have its central portion supported upon any suitable anti-frictional device upon which the disks bear as they revolve, such a device being either in the form of a roller, 20, Fig. 2, or a suitable, flexible belt B, shown by dotted lines in Fig. 1, may form a suitable suspending device for the shaft, this belt, in practice, passing around a pulley above. This pulley is not herein shown.

Other modifications may be made, depending upon the size of the shaft and the amount of power to be transmitted.

Having thus described my invention, what I claim and desire to secure by Letters Patent is—

1. A device for transmitting motion and changing the direction thereof, said device consisting of a fixed shaft curved to the desired change of direction, disks freely turnable upon said shaft, collars fixed upon the shaft between the disks, said collars being wedge-shaped with their sides converging from the outer to the inner edges, whereby the disks are maintained substantially radial to the center of curvature, and lugs carried by the disks adapted to engage each other exterior to the collars.

2. In an apparatus for transmitting power and changing direction, a fixed curved shaft, annular disks fitting and turnable thereon, wedge-shaped collars fixed to the shaft between the disks, lugs projecting from the disks and engaging with each other exterior to the collars, transmitting shafts having their ends journaled contiguous to the ends of the fixed curved shaft, said transmitting shafts having chambered enlargements fitting over the ends of the curved shaft, and lugs adapted to engage the lugs of the contiguous disks of the change device.

3. In an apparatus of the character described, a fixed shaft having a curvature to provide the desired change of direction, annular disks turnable upon the shaft, interposed wedge-shaped collars of smaller diameter, whereby the disks are held in planes substantially radial to the arc of curvature, lugs projecting from the sides of the disks adapted to engage each other, straight revoluble shafts in line with the ends of the curved shaft, said straight shafts having journal bearings and chambered ends into which the ends of the curved shaft extend, lugs upon the ends of the straight shafts which engage with the lugs of the contiguous disks, and anti-frictional bearings between the ends of the revoluble and the stationary shafts.

4. In an apparatus of the character described, a curved stationary shaft having revoluble interlocking disks and wedge-shaped separating collars, straight shafts journaled in line with the ends of the stationary shaft having interposed anti-frictional devices and lugs adapted to engage with the lugs of the revoluble disks, and devices whereby the curved portions of the apparatus are supported.

In testimony whereof I have hereunto set my hand in presence of two subscribing witnesses.

WALTER S. LEWIS.

Witnesses:
GEO. H. STRONG,
CHARLES EDELMAN.